United States Patent
Fujii (10) Patent No.: US 6,374,168 B1
(45) Date of Patent: Apr. 16, 2002

(54) SEAT BELT SYSTEM

(75) Inventor: Hiroaki Fujii, Tokyo (JP)

(73) Assignee: Takata Corporation, Tokyo (JP)

( * ) Notice: Subject to any disclaimer, the term of this patent is extended or adjusted under 35 U.S.C. 154(b) by 0 days.

(21) Appl. No.: 09/461,048

(22) Filed: Dec. 15, 1999

(30) Foreign Application Priority Data

Dec. 25, 1998 (JP) .......................................... 10-369758

(51) Int. Cl.[7] .............................. G06F 17/00; G06F 7/00
(52) U.S. Cl. ........................ 701/45; 180/268; 180/271; 280/735
(58) Field of Search ............................. 701/45, 46, 47; 180/232, 268, 271; 280/734, 735; 340/429, 436, 903

(56) References Cited

U.S. PATENT DOCUMENTS

| | | | |
|---|---|---|---|
| 4,569,536 A | 2/1986 | Tsuge et al. | 280/807 |
| 5,552,986 A | 9/1996 | Omura et al. | 701/45 |
| 5,558,370 A | 9/1996 | Behr | 280/806 |
| 5,788,281 A * | 8/1998 | Yanagi et al. | 280/806 |
| 6,116,639 A * | 9/2000 | Breed et al. | 280/735 |

FOREIGN PATENT DOCUMENTS

| | | |
|---|---|---|
| EP | 0 747 272 | 12/1996 |
| EP | 0 800 970 | 10/1997 |
| FR | 2 765 358 | 12/1998 |
| GB | 2 304 540 | 3/1997 |
| GB | 2 335 890 | 10/1999 |

* cited by examiner

Primary Examiner—Gertrude Arthur
(74) Attorney, Agent, or Firm—Kanesaka & Takeuchi (57) ABSTRACT

A seat belt system is formed of a seat belt, a seat belt retractor, a tension controller for controlling tension on the seat belt by controlling the seat belt retractor, and a CPU for controlling the tension controller to obtain a desired tension. Connected to the CPU are a collision predictive device, a rolling-over detecting device, a driver's state detecting device, a demonstration device, a notifying device for notifying a passenger by the tension on the seat belt, and a control condition setting device. Based on output signals from the above devices, the CPU operates the tension controller to control the belt tension, thereby protecting the occupant and notifying to the occupant the information by feeling the belt tension. The seat belt system can effectively exhibit enough safety and comfortableness to the occupant.

12 Claims, 6 Drawing Sheets

SEAT BELT SYSTEM

BACKGROUND OF THE INVENTION AND RELATED ART STATEMENT

The present invention relates to a seat belt system installed in a vehicle, such as automobile, for restraining and protecting an occupant by means of a seat belt and, more particularly, to a seat belt system provided with a belt controller for controlling the belt tension on the seat belt to correspond to the driving situation of the vehicle.

A seat belt system installed in a vehicle, such as automobile, comprises a seat belt retractor. In general, the seat belt retractor always biases the seat belt in a belt winding direction by means of a spiral spring so as to fit the seat belt on an occupant's body and to wind up the seat belt to store the seat belt therein when the seat belt is not used. Further, the seat belt retractor stops the withdrawal of the seat belt in case of emergency, such as vehicle collision, thereby preventing the forward movement of the occupant due to inertia.

In the conventional seat belt system, the seat belt is always biased in the belt winding direction without controlling the belt tension. Therefore, the force required for withdrawing the seat belt becomes too large to allow light handling of the seat belt. In addition, since the occupant is tightened hard by the force of the spring when the occupant wears the seat belt, the occupant feels oppression.

Therefore, it has been proposed in Japanese Unexamined Patent Publication No. H09-132113 to control the belt tension to improve comfortableness by reducing the force required for withdrawing the seat belt for wearing the seat belt and by setting the tension on the seat belt small in a normal wearing state and, and in addition, to improve the safety of the occupant by setting the tension large when it is determined by collision predictive means that there is a high possibility that the vehicle may come into collision.

According to this seat belt system, the belt tension can be controlled corresponding to the driving situation of the vehicle, whereby effective protection of the occupant can be expected.

In the seat belt system of the aforementioned publication, the control of the belt tension is applied only when the occupant withdraws the seat belt, when the occupant puts on the seat belt, and when it is determined by the collision predictive means that there is a high possibility that the vehicle may come into collision. However, the control of the belt tension is required not only the aforementioned situations but also other situations while the occupant is getting on the vehicle, the vehicle runs and the like. Therefore, it is hard to say that the conventional seat belt system can completely assure the safety and the compatibility of the occupant.

The present invention has been made under the aforementioned circumstances, and an object of the invention is to provide a seat belt system which can more effectively and completely assure the safety and comfortableness of the occupant.

SUMMARY OF THE INVENTION

To solve the above problems, the invention in a first aspect resides in a seat belt system having at least a tension controller for controlling the belt tension on a seat belt, which includes occupant's state detecting means for detecting the state of an occupant in wearing the seat belt and outputting a detected signal; and a central processing unit (CPU) for controlling the tension controller based on the detected signal from the occupant's state detecting means.

In addition, in a second aspect of the invention, the state of the occupant is indicated by at least one of parameters including the heart pulse rate, the blood pressure, the body temperature, and the bioelectric potential of the occupant. The CPU controls the tension controller in such a manner that the belt tension is increased with increasing the value of one or more of the parameters.

Further, in a third aspect of the invention, the occupant wearing the seat belt is a driver of the vehicle and that the state of the occupant is indicated by the action for operating the vehicle.

Further, in a fourth aspect of the invention, the action for operating the vehicle is selected from at least one of parameters including a speed for releasing an accelerator pedal, a speed for pedaling a brake pedal, a force exerted on the brake pedal, and steering angle. The CPU controls the tension controller in such a manner that the belt tension is increased with increasing the value of one or more of the parameters.

Further, the invention in a fifth aspect resides in a seat belt system having at least a tension controller for controlling the belt tension on a seat belt in which several predetermined modes having different belt tensions are set for the belt tension control, which includes demonstration means for outputting a simulation signal for one of the modes when the one mode is selected by the occupant wearing the seat belt, and a central processing unit (CPU) for controlling the tension controller, based on the simulation signal from the demonstration means, to set the belt tension corresponding to the mode indicated by the simulation signal.

Further, in the sixth aspect of the invention, the modes set for the tension control include at least a comfort mode in which the occupant does not feel pressure on his or her body when the occupant wears the seat belt, a warning mode operated in a condition such that an object comes closer but the collision with the object can be avoided, and a pre-rewinding mode operated in a condition such that an object comes closer and the collision with the object can not be avoided. The CPU controls the tension controller so as to set the belt tension corresponding to one of the modes.

Further, a seventh aspect of the invention resides in a seat belt system having at least a tension controller for controlling a belt tension on a seat belt, which comprises notifying means for outputting a notifying signal for notifying the occupant of various information with different belt tensions, and a central processing unit (CPU) for controlling the tension controller based on the notifying signal from the notifying means.

Further, in an eighth aspect of the invention, the various information comprises at least one information about a corner running, a roughness of a road surface, raindrops, an engine speed, a vehicle speed, lightning of headlamps, a rapid acceleration, a lighting of each indicator, actuation of an anti-locking brake control system, actuation of traction control system, arrival at a destination by a navigation system, a sporty mode set in a suspension control system, and a sporty mode set in a transmission system for a driving range. When it is determined based on the information about the corner running that the vehicle runs on a corner, when it is determined based on the information about the roughness on the road surface that the vehicle runs on a bumpy road, when it is determined based on the information about the raindrops that the vehicle runs in the rain, when it is determined based on the information about the engine speed that the engine runs at a speed higher than a reference engine speed, when it is determined based on the information about the vehicle speed that the vehicle runs at a speed higher than a reference vehicle speed, when it is determined based on the information about the lighting of the headlamps that the headlamps are turned on, when it is determined based on the information about the rapid acceleration that the vehicle accelerates rapidly, when it is determined based on the information about the lighting of the indicators that one of the indicators is turned on, when it is determined based on the information about the actuation of the anti-locking brake control system that the anti-licking base control system is actuated, when it is determined based on the information about the actuation of the traction control system that the traction control system is actuated, when it is determined based on the information about the arrival at a destination by the navigation system that the vehicle arrives at the destination, when it is determined based on the information about the sporty mode setting in the suspension control system that the suspension control system is set in the sporty mode, or when it is determined based on the information about the sporty mode setting in the transmission system for the driving range that the transmission control system is set in the sporty mode, the CPU controls the tension controller to increase the belt tension.

Further, the invention in a ninth aspect resides in a seat belt system having at least a tension controller for controlling a belt tension on a seat belt in which several predetermined modes having different belt tensions are set for the belt tension control, which comprises control condition setting means for outputting a setting signal for setting each mode; and a central processing unit (CPU) for controlling the tension controller, based on the setting signal from the control condition setting means, to set a condition for each mode.

Further, in a tenth aspect of the invention, the conditions for the modes comprise values to be set for each mode for the belt tension control, conditions to be satisfied for setting each mode for the belt tension control, and a sound to be emitted when each mode is set for the belt tension control.

Further, in an eleventh aspect of the invention, at least two of the first, fifth, seventh and ninth aspects may be combined.

Further, in a twelfth aspect of the invention, the system further comprises at least one of collision predictive means for detecting an object around the vehicle and outputting a signal to the CPU and rolling-over detecting means for detecting the rolling over of the vehicle body and outputting a signal to the CPU. The CPU controls the tension controller based on the output signal.

In the seat belt system structured as mentioned above according to the present invention, the belt tension is controlled corresponding to the state of an occupant wearing a seat belt, thereby effectively protecting the occupant. In addition, by using simulation signals, the occupant can feel the belt tension in each mode. This ensures that the occupant can securely know which tension control mode is set at present. By the belt tension, the occupant securely and easily knows the condition of the vehicle, the running condition of the vehicle, or the setting conditions of the respective control systems installed in the vehicles. In addition, since the conditions to be satisfied for the respective tension control modes can be set by the occupant wearing the seat belt, the occupant can set the belt tension to his or her preference.

Therefore, the seat belt system of the present invention can effectively exhibit enough safety and comfortableness for the occupant.

DETAILED DESCRIPTION OF PREFERRED EMBODIMENTS

Hereinafter, embodiments will be described with reference to the drawings.

Figure 1:
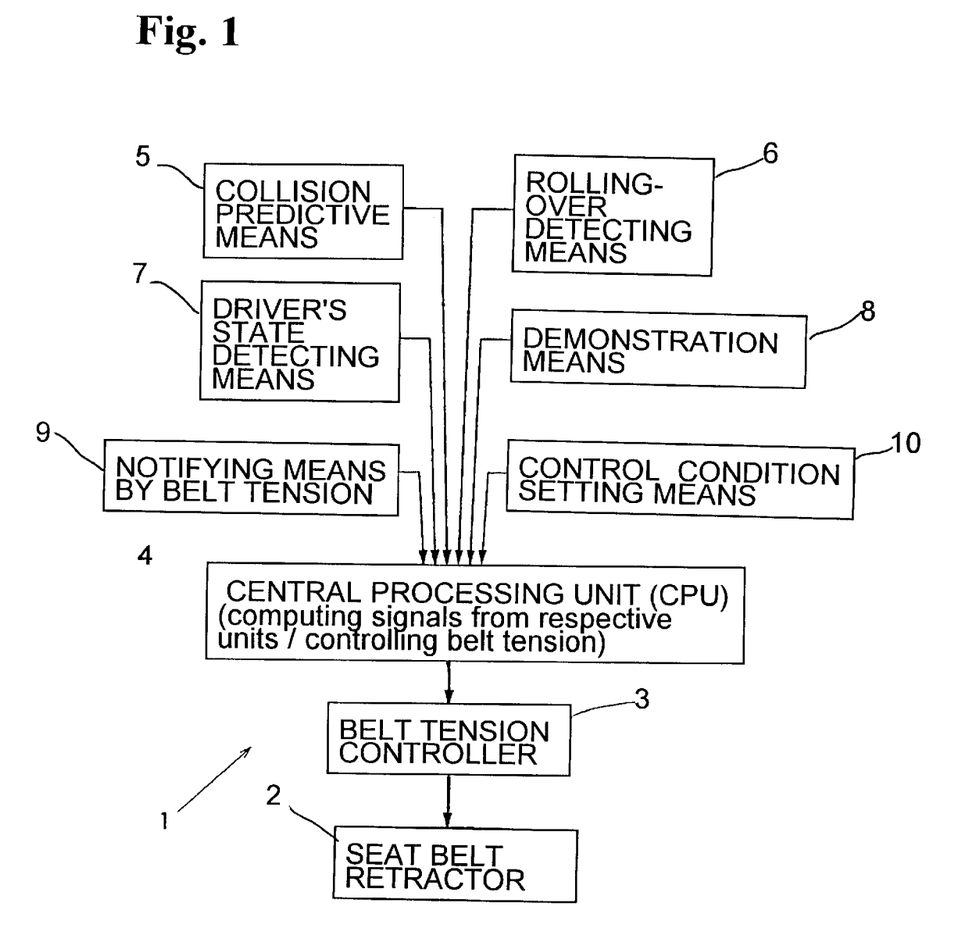
FIG. 1 is a diagram schematically showing an embodiment of a seat belt system for carrying out the present invention.

FIG. 1 is a diagram schematically showing the embodiment of a seat belt system as an example for carrying out the present invention.

As shown in FIG. 1, the seat belt system 1 of this embodiment basically comprises a seat belt retractor 2 for winding up a seat belt and for preventing withdrawal of the seat belt when deceleration exceeding a predetermined value acts on a vehicle, a tension controller 3 for controlling tension on the seat belt by controlling the winding of the seat belt retractor 2, and a central processing unit (hereinafter, sometimes referred as to "CPU") 4 for controlling the tension controller 3 to obtain a desired tension. Connected to the CPU 4 are collision predictive means 5, rolling-over detecting means 6, driver's (corresponding to an occupant of the present invention) state detecting means 7, demonstration means 8, notifying means 9 for notifying the occupant by the tension on the seat belt, and control condition setting means 10.

The seat belt retractor 2 is a normal retractor conventionally well known in the art, which winds up the seat belt by a biasing force of spring means, such as spiral spring, for biasing a reel and prevents withdrawal of the seat belt by actuation of deceleration sensing means when deceleration exceeding the predetermined value acts on the vehicle.

The tension controller 3 controls the belt tension by directly rotating the reel of the seat belt retractor 2 by the driving torque of a motor to wind or unwind the seat belt as disclosed in the aforementioned publication. Tension control of the tension controller 3 may be accomplished by controlling the biasing force of the spring means, such as spiral spring, by a motor, instead of directly rotating the reel of the retractor 2. This means that any method using the driving torque of the driving means such as the motor for directly or indirectly controlling the belt tension can be employed.

The CPU 4 computes the belt tension based on output signals from the collision predictive means 5, the rolling-over detecting means 6, the driver's state detecting means 7, the demonstration means 8 and the notifying means 9, and outputs a tension control signal to the tension controller 3 for controlling the belt tension corresponding to the result of the computation.

Figure 2:
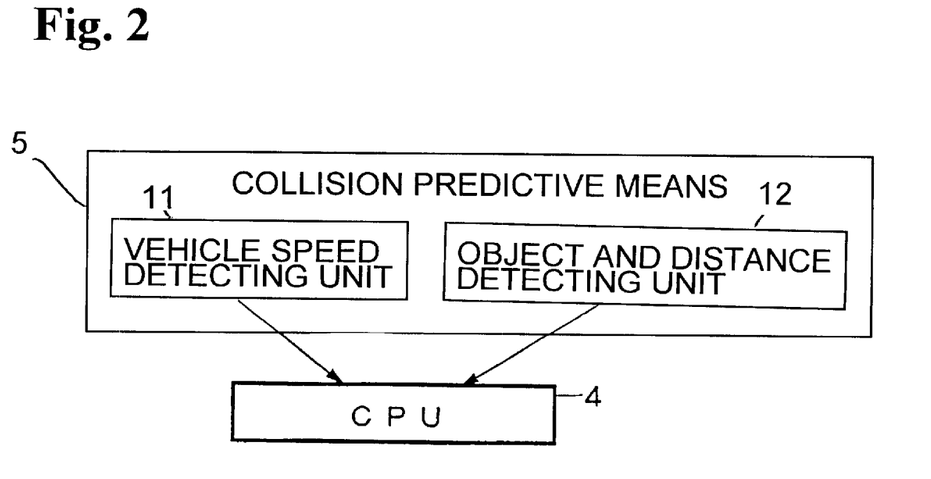
FIG. 2 is a diagram for explaining collision predictive means of the embodiment shown in FIG. 1.

As shown in FIG. 2, the collision predictive means 5 comprises a vehicle speed detecting unit 11, and an object and distance detecting unit 12, so that a vehicle speed signal from the vehicle speed detecting unit 11, an object detection signal and a distance signal indicating the distance between the object and the vehicle from the object and distance detecting unit 12 are inputted into the CPU 4.

The vehicle speed detecting unit 11 detects the vehicle speed when the vehicle runs forward, when the vehicle turns right or left and when the vehicle runs backward, and is composed of speed sensors for detecting the vehicle speed in the respective running modes. These speed sensors may be any of conventional speed indicators for detecting a speed, and for example a speedometer mounted on the vehicle may be employed.

The object and distance detecting unit 12 detects an object, such as other vehicle in front, on sides or on the back of the vehicle, and also detects the distance between the object and the vehicle. As the object and distance detecting unit 12, ultrasonic sensors and radars may be employed as disclosed in the aforementioned publication.

The CPU 4 judges whether or not there is a possibility that the vehicle may collide with the object or whether the possibility is high or low, based on the information about the vehicle speed and the information about the distance to the object. When it is determined that there is no possibility that the vehicle may collide with the object, the CPU 4 outputs a tension control signal to the tension controller 3 for allowing the belt tension small. When it is determined that there is a possibility that the vehicle may collide with the object but this collision can be avoided by the driver, the CPU 4 outputs a tension control signal to the tension controller 3 for allowing the belt tension larger than that of the case that there is no possibility of collision. When it is determined that there is a possibility that the vehicle may collide with the object and the collision may not be avoided by the driver, the CPU 4 outputs a tension control signal to the tension controller 3 for allowing the belt tension significantly larger than that of the case that the collision may be avoided by the driver. The tension controller 3 controls the operation of the seat belt retractor 2 corresponding to the output signal from the CPU 4 so that a desired tension is applied to the seat belt.

As one example of the judgement whether or not there is a possibility of collision and whether the possibility is high or low, there is a method of previously setting the reference value of the vehicle speed and the reference value of the relative distance, and it is determined when both the vehicle speed and the relative distance exceed the respective reference values. Of cause, the judgement is not limited thereto and other method may be employed.

Figure 3:
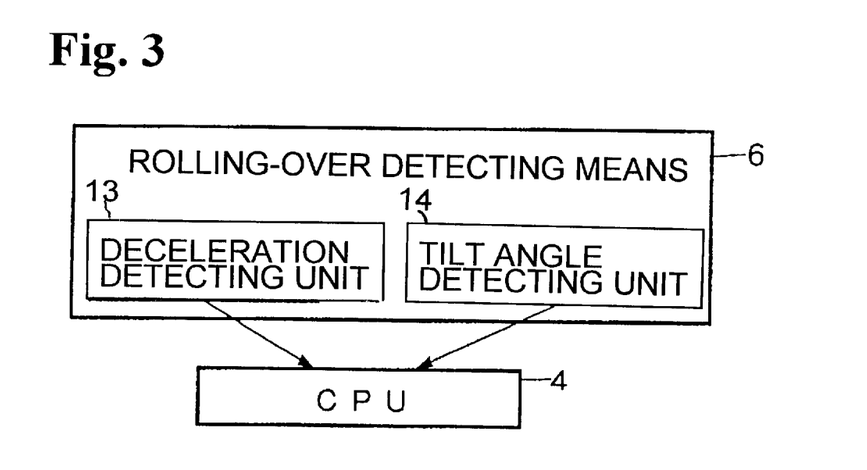
FIG. 3 is a diagram for explaining rolling-over detecting means of the embodiment shown in FIG. 1.

As shown in FIG. 3, the rolling-over detecting means 6 comprises a deceleration detecting unit 13 and a tilt angle detecting unit 14. A detected signal from the deceleration detecting unit 13 indicating the deceleration of the vehicle and a detected signal from the tilt angle detecting unit 14 indicating the tilt angle of the vehicle are inputted into the CPU 4.

The deceleration detecting unit 13 detects the deceleration of the vehicle when the vehicle runs forward or backward and when the vehicle turns right or left, and is composed of deceleration sensors for detecting the deceleration in the respective running modes. These deceleration sensors may be any conventional deceleration indicators for detecting deceleration. Alternatively, the deceleration may be computed by the CPU 4 based on the speed signals from the speed detecting unit 11.

The tilt angle detecting unit 14 detects a tilt at least in one of the forward, rearward, rightward, and leftward directions of the vehicle. As the tilt angle detecting unit 14, for example, a rolling-over detection sensor disclosed in the aforementioned publication may be employed. The rolling-over detection sensor of the publication comprises a standing weight, which normally stands vertically and tilts when the vehicle tilts at an angle exceeding a predetermined value in any direction and which has a hole extending in the axial direction thereof, and a light source for emitting light to pass through the hole. Therefore, the tilt of the vehicle can be detected when the standing weight tilts and the light passing through the hole of the standing weight is not received. Of cause, the tilt angle detecting unit 14 may be any conventional clinometers of detecting the tilt of the vehicle.

Then, the CPU 4 judges whether or not the vehicle rolls over based on the information about the deceleration and information about the tilt angle. When it is determined that the vehicle rolls over, the CPU 4 outputs a tension control signal to the tension controller 3 for allowing the belt tension at a predetermined value. In this case, the tension control signal is so set that the belt tension becomes larger as the deceleration of the vehicle and the tilt angle of the vehicle increase. The tension controller 3, in the same manner as mentioned before, controls the operation of the seat belt retractor 2 corresponding to the output signal from the CPU 4 in such a manner that a desired tension is applied to the seat belt.

Figure 4:
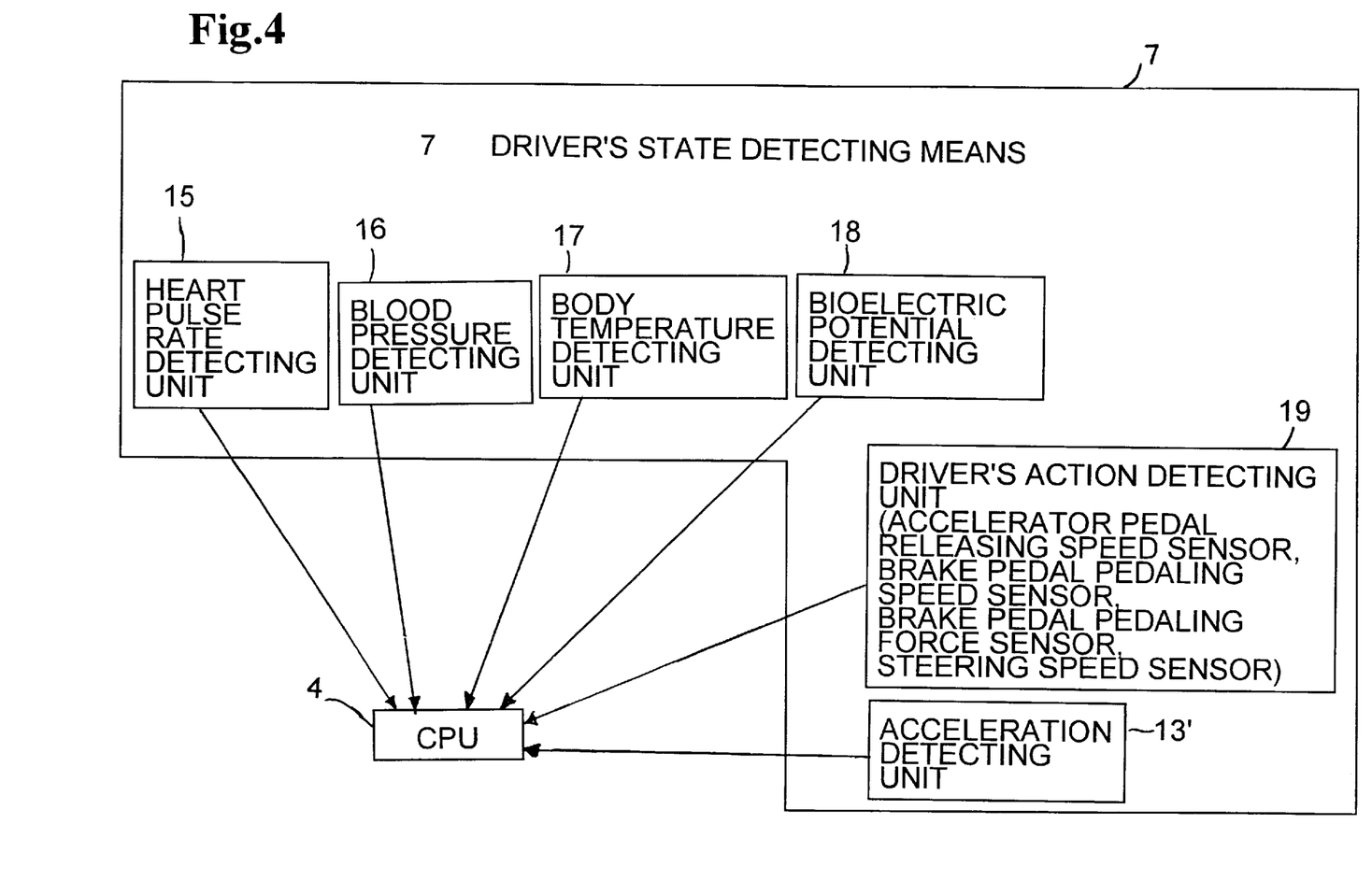
FIG. 4 is a diagram for explaining driver's state detecting means of the embodiment shown in FIG. 1.

As shown in FIG. 4, the driver's state detecting means 7 comprises a heart pulse rate detecting unit 15, a blood pressure detecting unit 16, a body temperature detecting unit 17, a bioelectric potential detecting unit 18, a driver's action detecting unit 19, and an acceleration detecting unit 13', so that a detected signal from the heart pulse rate detecting unit 15 indicating the heart pulse rate of the driver, a detected signal from the blood pressure detecting unit 16 indicating the blood pressure of the driver, a detected signal from the body temperature detecting unit 17 indicating the body temperature of the driver, a detected signal from the bioelectric potential detecting unit 18 indicating the bioelectric potential of the driver, a detected signal from the driver's action detecting unit 19 indicating the driver's action for operating the vehicle, and a detected signal from the acceleration detecting unit 13' indicating the acceleration of the vehicle are, respectively, inputted into the CPU 4.

The heart pulse rate detecting unit 15 detects the heart pulse rate of the driver. As the heart pulse rate detecting unit 15, for example, a microphone which can receive heart pulse may be employed but any devices which can detect the heart pulse rate of the driver as an electric signal may be employed. Instead of the heart pulse rate, the pulse rate may be detected from his or her arm. In a memory of the CPU 4, the reference heart pulse rate that is higher than the normal heart pulse rate of the driver by a predetermined rate is previously stored. For storing the heart pulse rate in the memory, a memory operational key may be provided at an instrument panel for allowing the input by the driver. The memory operational key also allows the stored reference heart pulse rate to be easily changed by the driver.

When the driver notices a possibility of collision with an object or an emergency situation of the vehicle such as rolling over, the heart pulse rate of the driver is increased. Based on the information about the heart pulse rate from the heart pulse rate detecting unit 15, the CPU 4 determines that the driver notices the emergency situation when the heart pulse rate of the driver exceeds the reference heart pulse rate and thus outputs a tension control signal to the tension controller 3 to set the belt tension to a predetermined large value. Then, the tension controller 3 controls the operation of the seat belt retractor 2 to make the belt tension at a predetermined value. In this way, when the driver notices the emergency situation, the belt tension is increased, thereby improving the safety of the driver.

Instead of the reference heart pulse rate, the normal heart pulse rate of the driver may be previously stored in the memory of the CPU 4 in the same manner as mentioned above. In this case, when the present heart pulse rate of the driver becomes higher than the normal heart pulse rate, the belt tension may be increased with increasing the difference value between the present heart pulse rate and the normal heart pulse rate.

The blood pressure detecting unit 16 detects the blood pressure of the driver. As the blood pressure detecting unit 16, any conventional hemodynamometers which can detect the blood pressure of the driver as an electric signal may be employed. In the memory of the CPU 4, the reference blood pressure that is higher than the normal blood pressure of the driver by a predetermined rate is previously stored. For storing the blood pressure in the memory, a memory operational key may be provided at the instrument panel for allowing the input by the driver. The memory operational key also allows the stored reference blood pressure to be easily changed by the driver.

When the driver notices a possibility of collision with an object or an emergency situation of the vehicle such as rolling over, the blood pressure of the driver is increased. Based on the information about the blood pressure from the blood pressure detecting unit 16, the CPU 4 determines that the driver notices the emergency situation when the blood pressure of the driver exceeds the reference blood pressure and thus outputs a tension control signal to the tension controller 3 to set the belt tension to a predetermined large value. Then, the tension controller 3 controls the operation of the seat belt retractor 2 to make the belt tension at a predetermined value. In this way, when the driver notices the emergency situation, the belt tension is increased, thereby improving the safety of the driver.

Instead of the reference blood pressure, the normal blood pressure of the driver may be previously stored in the memory of the CPU 4 in the same manner as mentioned above. In this case, when the present blood pressure of the driver becomes higher than the normal blood pressure, the belt tension may be increased with increasing difference value between the present blood pressure and the normal blood pressure.

The body temperature detecting unit 17 detects the body temperature of the driver. As the body temperature detecting unit 17, any conventional thermometer which can detect the body temperature of the driver as an electric signal may be employed. In the memory of the CPU 4, the reference body temperature that is higher than the normal body temperature of the driver by a predetermined rate is previously stored. The body temperature is stored in the memory in the same manner as that for the heart pulse rate and the blood pressure mentioned above.

When the driver notices an emergency situation as mentioned above, the body temperature of the driver is increased. Based on the information about the body temperature from the body temperature detecting unit 17, the CPU 4 determines that the driver notices the emergency situation when the body temperature of the driver exceeds the reference body temperature and thus outputs a tension control signal to the tension controller 3 to set the belt tension to a predetermined large value. Then, the tension controller 3 controls the operation of the seat belt retractor 2 to make the belt tension at the predetermined value. In this way also, when the driver notices the emergency situation, the belt tension is increased, thereby improving the safety of the driver. As the body temperature detecting unit 17, for example, an infrared ray sensor may be employed.

Instead of the reference body temperature, the normal body temperature of the driver may be previously stored in the memory of the CPU 4 in the same manner as mentioned above. In this case, when the present body temperature of the driver becomes higher than the normal body temperature, the belt tension may be increased with increasing the difference value between the present body temperature and the normal body temperature.

The bioelectric potential detecting unit 18 detects the bioelectric potential, concretely the variation in voltage, of the driver. As the bioelectric potential detecting unit 18, any conventional voltmeter which can detect the variation in voltage of the driver may be employed. In the memory of the CPU 4, the reference bioelectric potential that is higher than the normal bioelectric potential of the driver by a predetermined rate is previously stored. The bioelectric potential is stored in the memory in the same manner as that for the respective cases mentioned above.

When the driver notices an emergency situation as mentioned above, the bioelectric potential of the driver is increased. Based on the information about the bioelectric potential from the bioelectric potential detecting unit 18, the CPU 4 determines that the driver notices the emergency situation when the bioelectric potential of the driver exceeds the reference bioelectric potential and thus outputs a tension control signal to the tension controller 3 to set the belt tension to a predetermined large value. Then, the tension controller 3 controls the operation of the seat belt retractor 2 to make the belt tension at a predetermined value. In this way also, when the driver notices the emergency situation, the belt tension is increased, thereby improving the safety of the driver.

Instead of the reference bioelectric potential, the normal bioelectric potential of the driver may be previously stored in the memory of the CPU 4 in the same manner as mentioned above. In this case, when the present bioelectric potential of the driver becomes higher than the normal bioelectric potential, the belt tension may be increased with increasing the difference value between the present bioelectric potential and the normal bioelectric potential.

The driver's action detecting unit 19 detects the driver's action for operating the vehicle. Parameters indicating the driver's action for operating the vehicle include a speed for releasing an accelerator pedal, a speed for pedaling a brake pedal, a force exerted on the brake pedal, and a speed for moving a steering wheel. For detecting these parameters, the driver's action detecting unit 19 includes an accelerator pedal releasing speed sensor, a brake pedal pedaling speed sensor, a brake pedal pedaling force sensor, and a steering speed sensor. As the respective sensors, any well known sensor may be employed.

In the memory of the CPU 4, a reference accelerator pedal releasing speed, a reference brake pedal pedaling speed, a reference brake pedal pedaling force, a reference steering speed, a reference vehicle acceleration, and a reference vehicle deceleration are stored in the same manner as mentioned above.

Based on the information about the acceleration (deceleration) of the vehicle and the driver's action, the CPU 4 judges whether the driver performs the aforementioned action. When it is determined that the driver performs the aforementioned action in a predetermined accelerated (decelerated) state, the CPU 4 outputs a tension control signal to the tension controller 3 to set the belt tension to a predetermined large value. Concretely, when the accelerator pedal releasing speed exceeds the reference accelerator pedal releasing speed, it is determined that there is high possibility of emergency braking. When the brake pedal pedaling speed exceeds the reference brake pedal pedaling speed and the deceleration of the vehicle exceeds the reference deceleration, it is determined that this braking action is emergency braking. When the steering speed exceeds the reference steering speed, it is determined that this steering action is emergency steering. In all of the above cases, the tension control signals to be outputted by the CPU 4 are set to make the belt tension at a predetermined large value. In the same manner as the aforementioned cases, the tension controller 3 controls the operation of the seat belt retractor 2 corresponding to the output signal from the CPU 4 to make the belt tension at the predetermined value when it is determined that the driver performs the action in the predetermined accelerated (decelerated) state.

Information about the driver's action can be used alone or in combination.

The tension control caused by the information about the driver's action from the driver's action detecting means never make the driver feel bad because the driver is conscious even when the action is driver's mistake.

Figure 5:
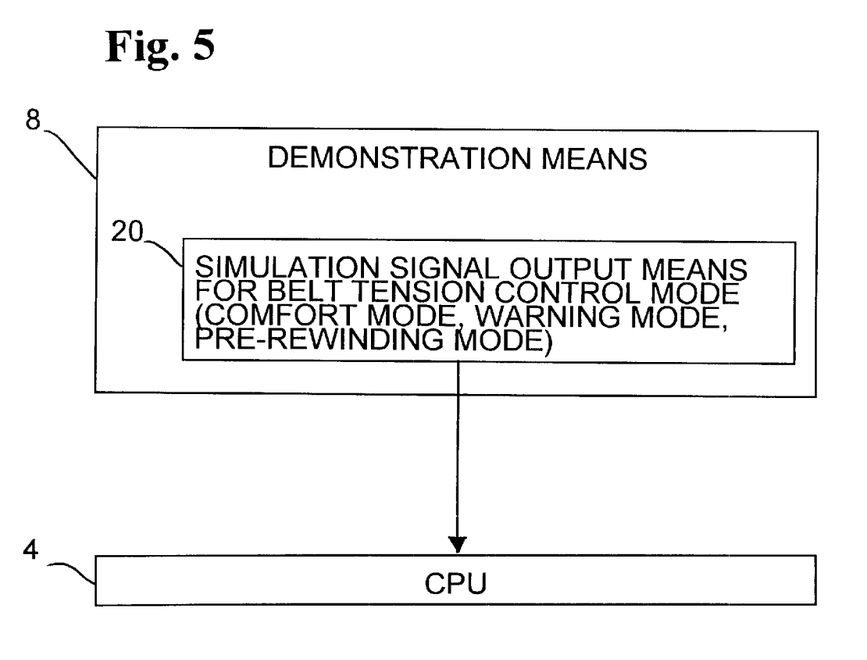
FIG. 5 is a diagram for explaining demonstration means of the embodiment shown in FIG. 1.

As shown in FIG. 5, the demonstration means 8 is composed of simulation signal output means 20 for a belt tension control mode, so that a simulation signal is inputted from the simulation signal output means 20 into the CPU 4.

The simulation signal output means 20 for a belt tension control mode is operated by the driver to output a simulation signal for one of belt tension control modes which is desired by the driver. The tension control modes include a comfort mode, a warning mode, and a pre-rewinding mode. The details for these modes will be understood by those skilled in the art after having read the aforementioned publication. A brief explanation will be made hereinafter. In the comfort mode, the belt tension is set to such a value that the occupant does not feel pressure on his or her body when the occupant wears the seat belt during the normal driving. In the warning mode, the belt tension is set to a value significantly larger than that of the comfort mode when it is determined that an object comes closer but the collision with the object may be avoided. In the pre-rewinding mode, the belt tension is set to a value significantly larger than that of the warning mode when it is determined that the object comes closer and the collision with the object may not be avoided.

As the simulation signal output means 20, an operational key mounted on the vehicle body, such as the instrument panel, may be employed. A remote controller may also be employed and a touch key on a display for a navigation system may also be employed.

Based on the information about the tension control mode from the simulation signal output means 20 operated by the occupant, the CPU 4 outputs a tension control signal to the tension controller 3 to set the belt tension to a preset value in the mode selected by the occupant. In the same manner as the aforementioned cases, the tension controller 3 controls the operation of the seat belt retractor 2 corresponding to the output signal from the CPU 4 to simulate the belt tension at the preset value in the mode selected by the occupant. This allows the occupant to experience the belt tensions in the respective modes and to know the degrees of the respective tensions.

Figure 6:
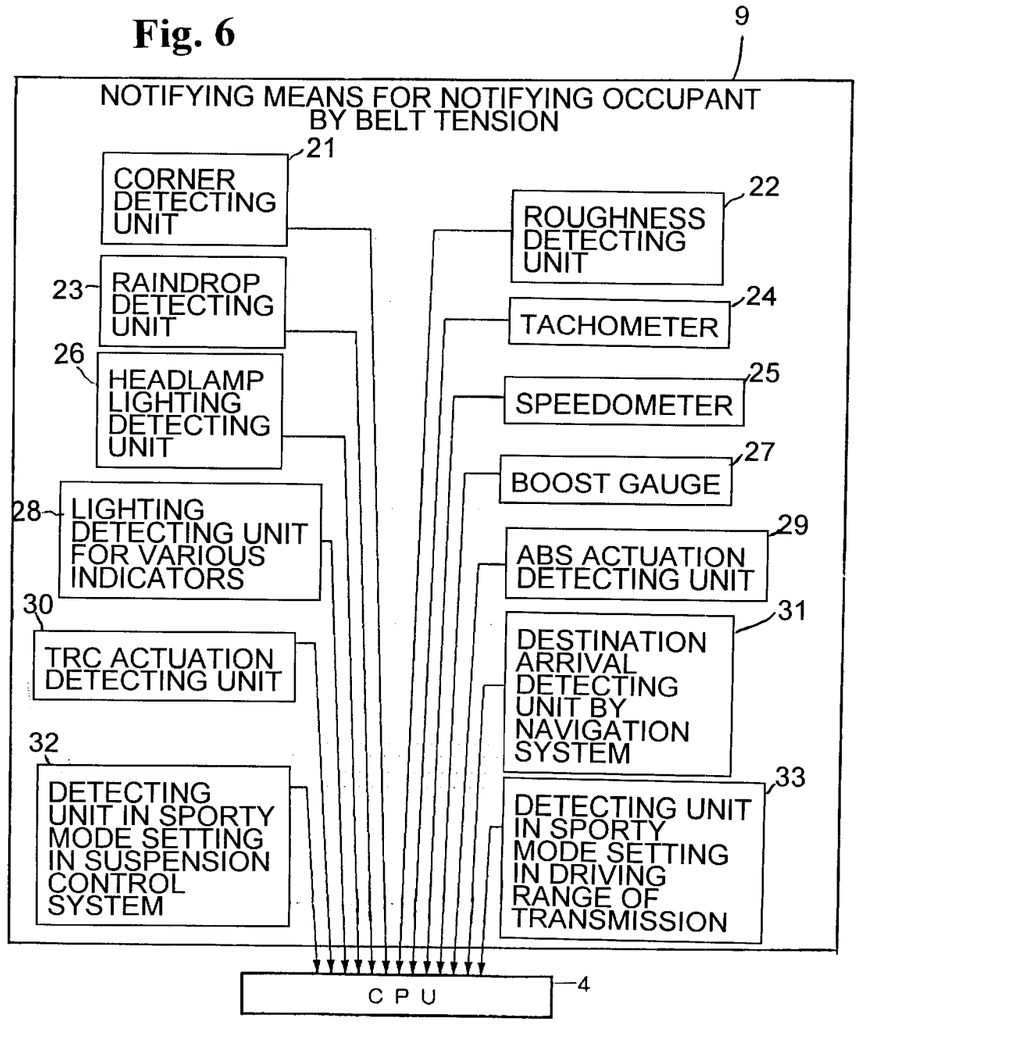
FIG. 6 is a diagram for explaining notifying means for notifying a passenger by the tension on the seat belt.

As shown in FIG. 6, the notifying means 9 for notifying the occupant by the belt tension comprises a corner detecting unit 21, a roughness detecting unit 22, a raindrop detecting unit 23, a tachometer 24, a speedometer 25, a headlamp lighting detecting unit 26, a boost gauge 27, a lighting detecting unit 28 for various indicators, an anti-locking brake control system (hereinafter, referred to as "ABS") actuation detecting unit 29, a traction control system (hereinafter, referred to as "TRC") actuation detecting unit 30, a destination arrival detecting unit 31 for detecting arrival at a destination by a navigation system, a detecting unit 32 for detecting a sporty mode set in a suspension control system (hereinafter, referred to as SC detecting unit 32), and a detecting unit 33 for detecting a sporty mode set in a transmission system for its driving range (hereinafter, referred to as MS detecting unit 33). A detected signal from the corner detecting unit 21 indicating a tilt of the vehicle body during cornering, a detected signal from the roughness detecting unit 22 indicating roughness of a road surface, a detected signal from the raindrop detecting unit 23 indicating rain, a detected signal from the tachometer 24 indicating the engine speed, a detected signal from the speedometer 25 indicating the vehicle speed, a detected signal from the headlamp lighting detecting unit 26 indicating lighting conditions of headlamps, a detected signal from the boost gauge 27 indicating an emergency acceleration of the vehicle, a detected signal from the lighting detecting unit 28 indicating the lighting of the indicators, a detected signal from the ABS actuation detecting unit 29 indicating an actuation of the ABS, a detected signal from the TRC actuation detecting unit 30 indicating an actuation of the TRC, an arrival signal from the destination arrival detecting unit 31, a detected signal from the SC detecting unit 32 indicating the setting in the sporty mode, and a detected signal from the MS detecting unit 33 indicating the setting in the sporty mode for the driving range from the transmission system are inputted into CPU 4.

The corner detecting unit 21 detects when the vehicle runs on a corner. For example, since the vehicle body tilts when the vehicle runs on a corner, such a condition can be detected by detecting the tilt of the vehicle body. As the corner detecting unit 21, for example, the tilt angle detecting unit 14 connected to the rolling-over detecting means 5 may be employed. Of cause, the corner detecting unit 21 may be any conventional clinometer of detecting the tilt of the vehicle.

The vehicle body tilts when the vehicle runs on a corner. Based on the information about the tilt of the vehicle body from the corner detecting unit 21, the CPU 4 determines that the vehicle runs on a corner and outputs a tension control signal to the tension controller 3 to set the belt tension at a predetermined large value. Then, the tension controller 3 controls the operation of the seat belt retractor 2 to increase the belt tension. Therefore, when the vehicle runs on a corner, the belt tension is increased, so that the occupant, e.g. driver, feels the increase of the belt tension and thus notices that the vehicle runs on the corner.

Instead of the tilt of the vehicle, the speed of the vehicle turning right or left may be detected to control the belt tension, so that the occupant notices that the vehicle runs on the corner.

The roughness detecting unit 22 detects roughness of a road surface. As the roughness detecting unit 22, for example, a vibration meter for detecting the vertical vibration of the vehicle may be employed. In the memory of the CPU 4, a reference amplitude by vibration is previously stored. For storing the reference amplitude in the memory, the driver may input with a memory operational key mounted on the instrument panel, or a car dealer may previously input when the vehicle is sold.

When the vehicle runs on a bumpy road, the vehicle body vibrates up and down. When the vibration detected by the vibration meter of the roughness detecting unit 22 exceeds the reference amplitude, the CPU 4 determines that the vehicle runs on a bumpy road and outputs a tension control signal to the tension controller 3 to set the belt tension at a predetermined large value. Then, the tension controller 3 controls the operation of the seat belt retractor 2 to increase the belt tension. Therefore, when the vehicle runs on a bumpy road, the belt tension is increased, so that the occupant e.g. driver, can be securely protected and feels the increase of the belt tension so as to notice that the vehicle runs on the bumpy road.

Instead of the vibration of the vehicle body, the acceleration in the vertical direction may be detected by using an accelerometer to control the belt tension, thereby protecting the occupant when the vehicle runs on a bumpy road and letting the occupant know that the vehicle runs on the bumpy road.

The raindrop detecting unit 23 detects raindrops on the vehicle body including a front windshield when it began to rain. As the raindrop detecting unit 23, any conventional raindrop sensor, such as raindrop sensor used for a wiper system which automatically moves wiper arms when it began to rain, may be employed.

When it began to rain, raindrops are put on the vehicle body. Based on the information about the raindrops from the raindrop detecting unit 23, the CPU 4 determines that it began to rain and outputs a tension control signal to the tension controller 3 to set the belt tension at a predetermined large value. Then, the tension controller 3 controls the operation of the seat belt retractor 2 to increase the belt tension. Therefore, when raindrops are put on the vehicle body, the belt tension is increased, so that the occupant, e.g. driver, can be securely protected and feels the increase of the belt tension so as to notice that it began to rain.

Also, in the memory of the CPU 4, a reference engine speed is previously stored. The reference engine speed may be stored by the driver in the same manner as mentioned above or previously stored by a car dealer when the vehicle is sold.

When the engine speed detected by the tachometer 24 exceeds the reference engine speed, the CPU 4 determines that the engine runs at a high speed and outputs a tension control signal to the tension controller 3 to set the belt tension at a predetermined large value. Then, the tension controller 3 controls the operation of the seat belt retractor 2 to increase the belt tension. Therefore, when the engine runs at a high speed, the belt tension is increased, so that the occupant, e.g. driver, can be securely protected and feels the increase of the belt tension so as to notice that the engine runs at the high speed.

Also, in the memory of the CPU 4, a reference vehicle speed is previously stored. The reference vehicle speed may be stored by the driver in the same manner as mentioned above, or previously stored by a car dealer when the vehicle is sold.

When the vehicle speed detected by the speedometer 25 exceeds the reference vehicle speed based on the information about the vehicle speed from the speedometer 25, the CPU 4 determines that the vehicle runs at a high speed and outputs a tension control signal to the tension controller 3 to set the belt tension at a predetermined large value. Then, the tension controller 3 controls the operation of the seat belt retractor 2 to increase the belt tension. Therefore, when the vehicle runs at a high speed, the belt tension is increased, so that the occupant, e.g. driver, can be securely protected and feels the increase of the belt tension so as to notice that the vehicle runs at the high speed.

The headlamp lighting detecting unit 26 detects when the headlamps are turned on. As the headlamp lighting detecting unit 26, a voltmeter which can detect a voltage applied to the headlamps when the headlamps are turned on may be employed or an ammeter which can detect a current flowing through the headlamps when the headlamps are turned on may be employed.

When the voltage applied to the headlamps is detected by the voltmeter or when the current flowing through the headlamps is detected by the ammeter, based on the information about the headlamps from the headlamp lightning detecting unit 26, the CPU 4 determines that the headlamps are turned on because sky is getting dark and outputs a tension control signal to the tension controller 3 to set the belt tension at a predetermined large value. Then, the tension controller 3 controls the operation of the seat belt retractor 2 to increase the belt tension. Therefore, when the headlamps are turned on, the belt tension is increased, so that the occupant, e.g. driver, can be securely protected and feels the increase of the belt tension so as to notice that the headlamps are turned on. This is, for example, for preventing the driver from forgetting to turn off the headlamps.

It should be understood that the CPU 4 may output the tension control signal to the tension controller 3 by directly using ON signal of an ON-OFF switch for the headlamps. In this case, the headlamp lighting detecting unit 26 is composed of the ON-OFF switch for the headlamps. This can eliminate the voltmeter or the ammeter, so that any special parts are not required, thereby easily making a system for the occupant protection when the headlamps are turned on at a lower cost.

Also in the memory of the CPU 4, a reference acceleration is previously stored. The reference acceleration may be stored by the driver in the same manner as mentioned above, or previously stored by a car dealer when the vehicle is sold.

When an acceleration detected by the boost gauge 27 exceeds the reference acceleration, based on the information about the acceleration from the boost gauge 27, the CPU 4 determines that the vehicle accelerates rapidly and outputs a tension control signal to the tension controller 3 to set the belt tension at a predetermined large value. Then, the tension controller 3 controls the operation of the seat belt retractor 2 to increase the belt tension. Therefore, when the vehicle accelerates rapidly, the belt tension is increased, so that the occupant, e.g. driver, can be securely protected and feels the increase of the belt tension so as to notice that the vehicle accelerates rapidly.

The lighting detecting unit 28 for various indicators detects when the indicators are turned on. The indicators may include, for example, a fuel indicator, a temperature indicator, a door open warning light, and an oil warning light which are generally conventionally installed in the instrument panel and the like. As the lighting detecting unit 28, voltmeters which can detect voltages applied to the indicators when the indicators are turned on may be employed or ammeters which can detect currents flowing through the indicators when the indicators are turned on may be employed.

When the voltage applied to the indicator is detected by the voltmeter or when the current flowing through the indicator is detected by the ammeter, based on the information about the indicators from the lighting detecting unit 28, the CPU 4 determines that the indicator is turned on and outputs a tension control signal to the tension controller 3 to set the belt tension at a predetermined large value. Then, the tension controller 3 controls the operation of the seat belt retractor 2 to increase the belt tension. Therefore, when the indicator is turned on, the belt tension is increased so that the occupant, e.g. driver, can be securely protected and feels the increase of the belt tension so as to notice that the indicator is turned on. This is for calling the driver's attention to the matter notified by the indicator which is turned on.

It should be understood that the CPU 4 may output the tension control signal to the tension controller 3 by directly using ON signal of the indicator. In this case, the lighting detecting unit 28 is composed of sensors (e.g. fuel reserve meter) for detecting things to be notified by indicators, respectively. This can eliminate the voltmeter or the ammeter, so that any special parts are not required, thereby easily making a system for notifying the occupant of the lighting of each indicator at a lower cost.

The ABS actuation detecting unit 29 detects when the ABS operates for its anti-locking control (hereinafter, sometimes referred to as "ABS control") for canceling a locking tendency of the vehicle wheels during a braking operation. As the ABS actuation detecting unit 29, a device which can detect actuation of an ABS modulator (solenoid valve) for regulating the brake pressure, for example, a voltmeter which can detect a voltage applied to the ABS modulator at the actuation of the ABS modulator may be employed or an ammeter which can detect a current flowing through the ABS modulator at the actuation of the ABS modulator may be employed. A sensor which can detect movement of a valve element of the ABS modulator may also be employed.

When the voltage applied to the ABS modulator is detected by the voltmeter, when the current flowing through the ABS modulator is detected by the ammeter, or when the movement of the valve element of the ABS modulator is detected, based on the information about the actuation of the ABS modulator from the ABS actuation detecting unit 29, the CPU 4 determines that the ABS is actuated and outputs a tension control signal to the tension controller 3 to set the belt tension at a predetermined large value. Then, the. tension controller 3 controls the operation of the seat belt retractor 2 to increase the belt tension. Therefore, when the ABS is actuated, the belt tension is increased, so that the occupant, e.g. driver, can be securely protected and feels the increase of the belt tension so as to notice that the ABS is actuated.

It should be understood that the CPU 4 may output the tension control signal to the tension controller 3 by directly using ON signal outputted from the central processing unit of the ABS to the ABS modulator. In this case, the ABS actuation detecting unit 29 is composed of the central processing unit of the ABS. This can eliminate the voltmeter or the ammeter, so that any special parts are not required, thereby easily making a system for protecting the occupant during the actuation of the ABS at a lower cost.

The TRC actuation detecting unit 30 detects when the TRC operates for its traction control (hereinafter, sometimes referred to as "TRC control") for canceling a slipping tendency of the vehicle wheel during the starting or rapid accelerating operation. Conventionally, the TRC control is performed by brake control for driving wheels, engine control, or gear control or by a combination thereof.

In case of a system in which the TRC control is performed by the brake control, as the TRC actuation detecting unit 30, a device which can detect the actuation of a TRC modulator (solenoid valve) for regulating the brake pressures, for example, a voltmeter which can detect a voltage applied to the TRC modulator at the actuation of the TRC modulator may be employed, or an ammeter which can detect a current flowing through the TRC modulator at the actuation of the TRC modulator may be employed, just like the aforementioned ABS.

When the voltage applied to the TRC modulator is detected by the voltmeter or when the current flowing through the TRC modulator is detected by the ammeter, based on the information about the actuation of the TRC modulator from the TRC actuation detecting unit 30, the CPU 4 determines that the TRC is actuated and then outputs a tension control signal to the tension controller 3 to set the belt tension at a predetermined large value. Then, the tension controller 3 controls the operation of the seat belt retractor 2 to increase the belt tension. Therefore, when the TRC is actuated, the belt tension is increased, so that the occupant, e.g. driver, can be securely protected and feels the increase of the belt tension so as to notice that the TRC is actuated.

It should be understood that the CPU 4 may output the tension control signal to the tension controller 3 by directly using ON signal outputted from the central processing unit of the TRC to the TRC modulator. In this case, the TRC actuation detecting unit 30 is composed of the central processing unit of the TRC. This can eliminate the voltmeter or the ammeter, so that any special parts are not required, thereby easily making a system for protecting the occupant during the actuation of the TRC at a lower cost.

In case of a system in which the TRC control is performed by the engine control, as the TRC actuation detecting unit 30, a sensor which can detect the pedaling operation of the accelerator pedal, the aforementioned tachometer 24, a voltmeter or an ammeter which can detect control signals to a fuel injection controller may be employed. The control signals from the central processing unit of the TRC to the fuel injection controller may also be used directly. In this case, the central processing unit of the TRC is used as the TRC actuation detecting unit 30.

When the pedaling of the accelerator pedal is detected and it is detected that the engine speed detected by the tachometer does not reach the engine speed corresponding to the pedaling of the accelerator pedal, when it is detected that the voltage applied to the fuel injection controller is controlled as the TRC control by the voltmeter, or when it is detected that the TRC control signal is outputted from the central processing unit of the TRC to the fuel injection controller, based on the information about the actuation of the TRC from the TRC actuation detecting unit 30, the CPU 4 determines that the TRC is actuated and outputs a tension control signal to the tension controller 3 to set the belt tension at a predetermined large value. Then, the tension controller 3 controls the operation of the seat belt retractor 2 to increase the belt tension. Therefore, when the TRC is actuated, the belt tension is increased, so that the occupant, e.g. driver, can be securely protected and feels the increase of the belt tension so as to notice that the TRC is actuated.

In case of a system in which the TRC control is performed by a gear control of a gearbox unit, the control signals from the central processing unit of the TRC to the gear control system may be used directly. In this case, the central processing unit of the TRC is used as the TRC actuation detecting unit 30.

When it is detected that the TRC control signal is outputted from the central processing unit of the TRC to the gear control system, based on the information about the actuation of the TRC from the TRC actuation detecting unit 30, the CPU 4 determines that the TRC is actuated and outputs a tension control signal to the tension controller 3 to set the belt tension at a predetermined large value. Then, the tension controller 3 controls the operation of the seat belt retractor 2 to increase the belt tension. Therefore, when the TRC is actuated, the belt tension is increased, so that the occupant, e.g. driver, can be securely protected and feels the increase of the belt tension so as to notice that the TRC is actuated.

The destination arrival detecting unit 31 detects that the navigation system displays that the vehicle arrives at a destination set in the navigation system by the occupant when the vehicle is equipped with the navigation system and the navigation system is actuated. For detecting the arrival at a destination, a display signal from a central processing unit of the navigation system can be used. In this case, the central processing unit of the navigation system is used as the destination arrival detecting unit 31.

When it is detected that the display signal is outputted from the central processing unit of the navigation system, based on the information about the destination arrival from the destination arrival detecting unit 31, the CPU 4 determines that the vehicle arrives at the destination and then outputs a tension control signal to the tension controller 3 to set the belt tension at a predetermined large value. Then, the tension controller 3 controls the operation of the seat belt retractor 2 to increase the belt tension. Therefore, when the vehicle arrives at the destination, the belt tension is increased, so that the occupant, e.g. driver, feels the increase of the belt tension so as to notice that the vehicle arrives at the destination.

The SC detecting unit or sporty mode detecting unit 32 in a suspension control system detects that the sporty mode is set in the suspension control system when the vehicle is equipped with the suspension control system. For detecting the sporty mode setting, a sporty mode setting signal from a central processing unit of the suspension control system can be used. In this case, the central processing unit of the suspension control system is used as the SC detecting unit 32.

When it is detected that the sporty mode setting signal is outputted from the central processing unit of the suspension control system, based on the information about the sporty mode setting from the SC detecting unit 32, the CPU 4 determines that the suspension control system is set for the sporty mode and then outputs a tension control signal to the tension controller 3 to set the belt tension at a predetermined large value. Then, the tension controller 3 controls the operation of the seat belt retractor 2 to increase the belt tension. Therefore, when the suspension control system is set for the sporty mode, the belt tension is increased, so that the occupant, e.g. driver, can be securely protected and feels the increase of the belt tension so as to notice that the suspension control system is set in the sporty mode.

The MS detecting unit or sporty mode detecting unit 33 in a transmission system detects that the sporty mode is set in the transmission control system for the driving range (hereinafter, sometimes referred to as "D range") when the vehicle is equipped with the transmission control system. For detecting the sporty mode setting, a sporty mode setting signal from a central processing unit of the transmission control system can be used. In this case, the central processing unit of the transmission control system is used as the MS detecting unit 33.

When it is detected that the sporty mode setting signal is outputted from the central processing unit of the transmission control system, based on the information about the sporty mode setting from the MS detecting unit 33, the CPU 4 determines that the transmission control system is set in the sporty mode and then outputs a tension control signal to the tension controller 3 to set the belt tension at a predetermined large value. Then, the tension controller 3 controls the operation of the seat belt retractor 2 to increase the belt tension. Therefore, when the transmission is set in the sporty mode for the D range, the belt tension is increased, so that the occupant, e.g. driver, can be securely protected and feels the increase of the belt tension so as to notice that the transmission is set in the sporty mode.

Figure 7:
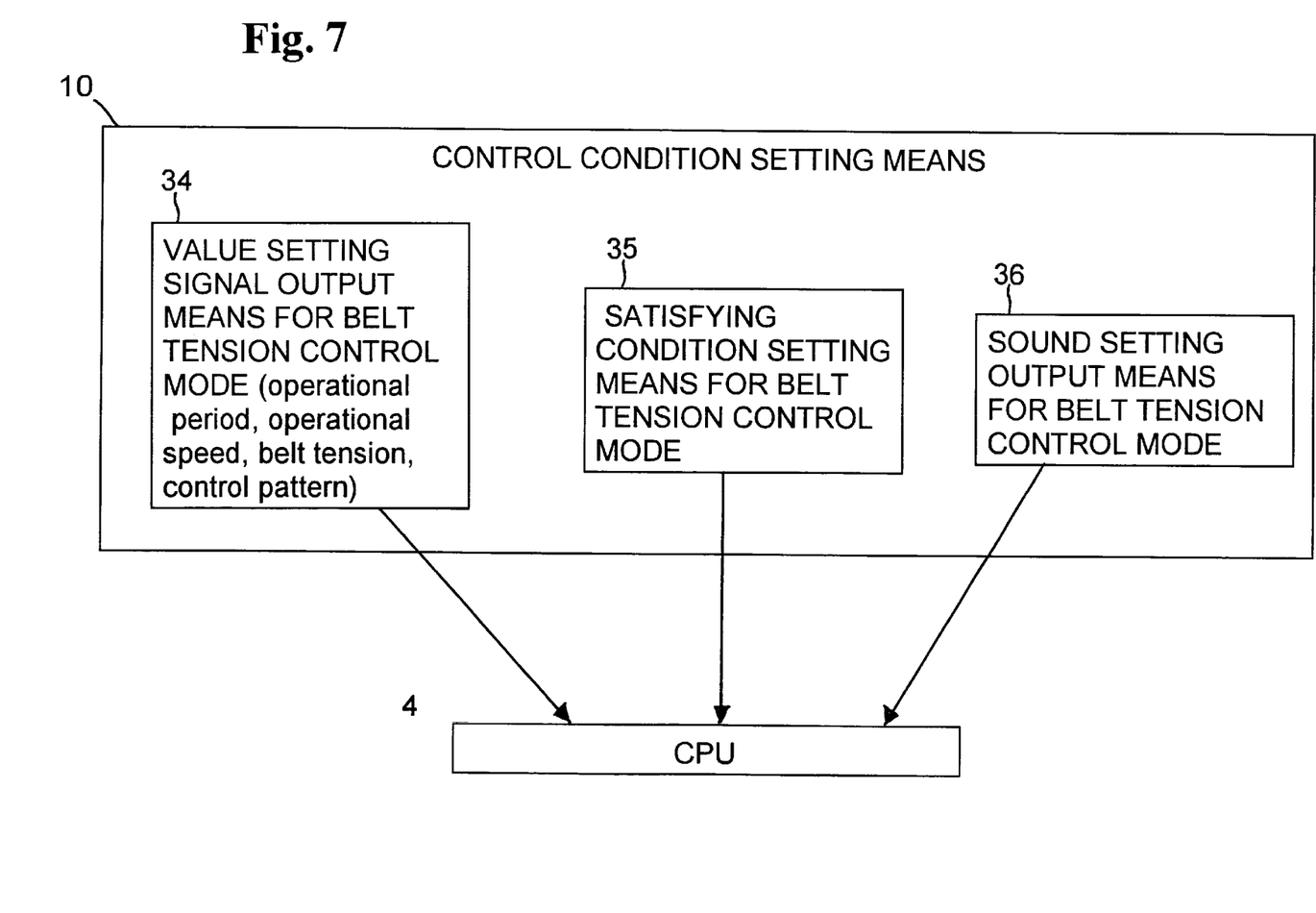
FIG. 7 is a diagram for explaining control condition setting means of the embodiment shown in FIG. 1.

As shown in FIG. 7, the control condition setting means 10 comprises value setting signal output means 34 for belt tension control mode, satisfying condition setting means 35 for the belt tension control mode, and sound setting output means 36 for the belt tension control mode, so that a value setting signal from the value setting signal output means 34 for the belt tension control mode, a condition setting signal from the satisfying condition setting means 35 for the belt tension control mode, and a sound setting output signal from the sound setting output means 36 are inputted into the CPU 4, respectively.

The value setting signal output means 34 for the belt tension control mode is operated by the occupant, e.g. driver, to output value setting signals for setting values for each mode for the belt tension control to the control condition setting means 10 and stores the set values in the memory of the CPU 4. As concretely described, when the comfort mode, the warning mode, and the pre-rewinding mode are set in the tension control system as described above, values for, for example, the operational period and the operational speed for setting the system in one of the modes, the belt tension for each mode, the control pattern for each mode can be set to values desired by the occupant by operating the value setting signal output means 34. For instance, the value setting signal output means 34 may be composed of a display installed in a portion of the vehicle body, such as instrument panel, and touch key displayed on the display. In this case, the operational period, the operational speed, and the belt tension may be set numerically by using a numeric keypad. Alternatively, three patterns "short", "middle", and "long" for the operational period, three patterns "fast", "middle", and "slow" for the operational speed, and three patterns "large", "middle", and "small" for the belt tension may be stored in the memory of the CPU 4, so that the occupant can select and set desired patterns by using the touch key on the display.

Thus, the occupant can set the values for the operational period, the operational speed, the belt tension, and the control pattern for each mode of the belt tension control.

The satisfying condition setting means 35 for the belt tension control modes is operated by the occupant, e.g. driver, to output condition setting signals for setting conditions to be satisfied for performing each mode for the belt tension control and stores the set conditions in the memory of the CPU 4. Just like the occupant restraint protective system disclosed in the publication, when the comfort mode, the warning mode, and the pre-rewinding mode are set in the tension control system, conditions for satisfying modes should be set to perform each of the modes. In the same manner as the case for setting the values mentioned above, the conditions to be satisfied for performing the modes, for example, the vehicle speed, the distance to an object, and the speed relative to the object, can be set by the occupant using the touch key on the display.

The sound setting output means 36 for the belt tension control modes is operated by the occupant, e.g. driver, to output sound setting signals for setting sounds corresponding to the respective modes, each of which is emitted when each of the modes is performed for the belt tension control, and stores the set conditions in the memory of the CPU 4. That is, when the comfort mode, the warning mode, and the pre-rewinding mode are set in the tension control system as described above, respective sounds corresponding to the modes may be emitted when the respective modes are performed for the belt tension control and the sounds can be set to desired sounds by the occupant. Concretely, artificial sounds and/or desired recorded sounds are stored in the memory of the CPU 4 and the occupant can set the stored sounds to correspond to the respective modes by using an operational key or the touch key on the display. The stored sounds can be easily changed by the occupant by the key operation. This means that the stored sound can be eliminated and a new desired sound can be inputted. In this manner, when the system is set in one of the modes for the belt tension control and is operated in the set mode, the sound corresponding to the set mode is emitted, thereby securely providing notice to the occupant as to which mode is set. In addition, since the emitted sounds are preferable sounds of the occupant, the occupant can comfortably hear the sounds.

It should be noted that a remote control may also be employed and the touch key on the display for the navigation system may also be employed as the control condition setting means 10.

As apparent from the above description, according to the seat belt system of the present invention, the belt tension control can be set corresponding to the condition of the occupant wearing the seat belt, thereby effectively protecting the occupant. Since the occupant can notice the belt tension by outputting the simulation signals, the occupant can securely know which tension control mode is set at present. By the belt tension, the occupant securely and easily knows the condition of the vehicle, the running condition of the vehicle, or the setting conditions of the respective control systems installed in the vehicles. In addition, since the conditions to be satisfied for the respective tension control modes can be set by the occupant wearing the seat belt, the occupant can set the belt tension to his or her preference.

Therefore, the seat belt system of the present invention can effectively exhibit enough safety and comfortableness for the occupant.

While the invention has been explained with reference to the specific embodiments of the invention, the explanation is illustrative and the invention is limited only by the appended claims.

What is claimed is:

1. A seat belt system comprising:
a seat belt for an occupant,
a tension controller connected to the seat belt for controlling a belt tension on the seat belt, said tension controller including a plurality of predetermined modes providing different belt tensions,
a state detecting device for detecting a state of the occupant wearing the seat belt and outputting a detected signal,
a demonstration device connected to the tension controller for outputting one of simulation signals for the modes when one of the modes is selected by the occupant wearing the seat belt, and
a CPU connected to the state detecting device, the tension controller and the demonstration device, said CPU controlling the tension controller based on the simulation signal from the demonstration device to set the belt tension corresponding to the mode indicated by the simulation signal and controlling the tension controller based on the detected signal from the state detecting device so that the occupant can experience the belt tension of the mode selected at the demonstration device as a demonstration.

2. A seat belt system as claimed in claim 1, wherein said state detecting device indicates at least one of parameters of the occupant including a heart pulse rate, a blood pressure, a body temperature, and a bioelectric potential, said CPU controlling said tension controller such that said belt tension is increased as a value of at least one of the parameters increases.

3. A seat belt system as claimed in claim 1, wherein said occupant wearing the seat belt is a driver of a vehicle, and the state of the occupant includes action for operating the vehicle.

4. A seat belt system as claimed in claim 3, wherein said action for operating the vehicle includes at least one parameter including a speed for releasing an accelerator pedal, a speed for pedaling a brake pedal, a force exerted on the brake pedal, and a steering angle in steering a steering wheel, said CPU controlling said tension controller such that the belt tension is increased as a value of at least one of the parameters increases.

5. A seat belt system as claimed in claim 1, further comprising a notifying device connected to the tension controller and the CPU for providing at least one information to the occupant, said CPU controlling said tension controller to provide different belt tensions based on a notifying signal from the notifying device.

6. A seat belt system as claimed in claim 5, further comprising a control condition setting device connected to the tension controller and the CPU for outputting a setting signal for setting each mode, said CPU controlling the tension controller, based on the setting signal from the control condition setting device, to set a condition for each mode.

7. A seat belt system comprising:
a seat belt for an occupant,
a tension controller connected to the seat belt for controlling a belt tension on the seat belt, said tension controller including a plurality of predetermined modes providing different belt tensions,
a demonstration device connected to the tension controller for outputting one of simulation signals for the modes when one of the modes is selected by the occupant wearing the seat belt, and
a CPU connected to the tension controller and the demonstration device, said CPU controlling said tension controller, based on said simulation signal from the demonstration device, to set the belt tension corresponding to the mode indicated by the simulation signal so that the occupant can experience the belt tension of the mode selected at the demonstration device as a demonstration.

8. A seat belt system as claimed in claim 7, wherein said modes set by the tension control include a comfort mode in which the occupant does not feel pressure on a body when the occupant wears the seat belt, a warning mode set in a condition that an object comes closer but a collision with the object may be avoided, and a pre-rewinding mode set in a condition that an object comes closer and a collision with the object may not be avoided, said CPU controlling said tension controller for setting the belt tension corresponding to the set mode.

9. A seat belt system comprising:

a seat belt for an occupant, a tension controller connected to the seat belt for controlling a belt tension on the seat belt, a notifying device for providing at least one information to the occupant, said at least one information including information about corner running, roughness of a road surface, raindrops, an engine speed, a vehicle speed, lighting of headlamps, a rapid acceleration, lighting of indicators, an actuation of an anti-locking brake control system, an actuation of a traction control system, arrival at a destination by a navigation system, a sporty mode set in a suspension control system, and a sporty mode set in a transmission system for a driving range, and a CPU connected to the tension controller and the notifying device, said CPU controlling said tension controller to provide different belt tensions based on a notifying signal from said notifying device, wherein when it is determined based on the information about the corner running that a vehicle runs on a corner, when it is determined based on the information about the roughness on the road surface that the vehicle runs on a bumpy road, when it is determined based on the information about the raindrops that the vehicle runs in a rain, when it is determined based on the information about the engine speed that the engine runs at a speed higher than a reference engine speed, when it is determined based on the information about the vehicle speed that the vehicle runs at a speed higher than a reference vehicle speed, when it is determined based on the information about the lighting of the headlamps that the headlamps are turned on, when it is determined based on the information about the rapid acceleration that the vehicle accelerates rapidly, when it is determined based on the information about the lighting of the indicators that one of the indicators is. turned on, when it is determined based on the information about the actuation of the anti-locking brake control system that the anti-licking base control system is actuated, when it is determined based on the information about the actuation of the traction control system that the traction control system is actuated, when it is determined based on the information about the arrival at a destination by the navigation system that the vehicle arrives at the destination, when it is determined based on the information about the sporty mode set in the suspension control system that the suspension control system is set in the sporty mode, or when it is determined based on the information about the sporty mode set in the transmission system for a driving range that the transmission control system is set in the sporty mode, said CPU controls said tension controller to increase said belt tension.

10. A seat belt system comprising:

a seat belt for an occupant, a tension controller connected to the seat belt for controlling a belt tension on the seat belt, said tension controller having several predetermined modes with different belt tensions including values to be set for the respective modes for a belt tension control, conditions to be satisfied for setting the respective modes for the belt tension control, and sounds to be emitted when the respective modes are set for the belt tension control, a control condition setting device for setting the belt tension of each mode by the occupant, and a CPU connected to the tension controller and the control condition setting device, said CPU controlling the tension controller, based on the setting signal from the control condition setting device, to set a condition for each mode.

11. A seat belt system as claimed in claim 10, further comprising at least one of a collision predictive device for detecting an object around a vehicle and outputting a signal to the CPU, and a rolling-over detecting device for detecting rolling over of the vehicle and outputting a signal to the CPU, said CPU controlling said tension controller based on the output signal.

12. A seat belt system comprising:

a seat belt for a driver of a vehicle, a tension controller connected to the seat belt for controlling a belt tension on the seat belt, a state detecting device for detecting an action for operating the vehicle by the driver wearing the seat belt and outputting a detected signal, said action for operating the vehicle including at least one parameter selected from a group consisting of a speed for releasing an accelerator pedal, a speed for pedaling a brake pedal, a force exerted on the brake pedal, and a steering angle in steering a steering wheel, and a CPU connected to the state detecting device and the tension controller, said CPU controlling the tension controller based on the detected signal from the state detecting device such that when a value of the at least one of the parameters exceeds a predetermined value, said belt tension is increased as the value of the at least one of the parameters increases to thereby immediately control the belt tension based on the state detecting device.

* * * * *